(12) United States Patent
Yokozawa

(10) Patent No.: US 10,373,031 B2
(45) Date of Patent: Aug. 6, 2019

(54) MOVEMENT CONTROL DEVICE, INK-DROPLET EJECTION DEVICE, MOVEMENT CONTROL METHOD, AND RECORDING MEDIUM

(71) Applicant: Suguru Yokozawa, Kanagawa (JP)

(72) Inventor: Suguru Yokozawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/419,169

(22) Filed: Jan. 30, 2017

(65) Prior Publication Data
US 2017/0217230 A1   Aug. 3, 2017

(30) Foreign Application Priority Data

Feb. 2, 2016 (JP) .................. 2016-018437
Nov. 25, 2016 (JP) .................. 2016-229338

(51) Int. Cl.
| | | |
|---|---|---|
| G06K 15/00 | (2006.01) | |
| H04N 1/047 | (2006.01) | |
| G06K 15/10 | (2006.01) | |
| B41J 19/20 | (2006.01) | |

(52) U.S. Cl.
CPC ............ *G06K 15/40* (2013.01); *B41J 19/207* (2013.01); *G06K 15/102* (2013.01); *H04N 1/047* (2013.01); *G06K 2215/0082* (2013.01); *G06K 2215/101* (2013.01); *H04N 2201/0082* (2013.01); *H04N 2201/0471* (2013.01)

(58) Field of Classification Search
None
See application file for complete search history.

(56) References Cited

U.S. PATENT DOCUMENTS

| | | | | |
|---|---|---|---|---|
| 8,698,441 B2* | 4/2014 | Ogura | ................... | G05B 13/02 |
| | | | | 318/266 |
| 2013/0286067 A1* | 10/2013 | Arakane | ................ | B41J 19/142 |
| | | | | 347/9 |
| 2014/0146103 A1 | 5/2014 | Yokozawa | | |
| 2014/0152736 A1* | 6/2014 | Yokozawa | ................. | B41J 2/12 |
| | | | | 347/19 |
| 2016/0089886 A1* | 3/2016 | Mizutani | ............. | B41J 2/16511 |
| | | | | 347/32 |

FOREIGN PATENT DOCUMENTS

JP        4481121        3/2010

* cited by examiner

*Primary Examiner* — Alejandro Valencia
(74) *Attorney, Agent, or Firm* — Harness, Dickey & Pierce, P.L.C.

(57) ABSTRACT

A movement control device configured to determine whether the moving unit moved by a driving unit is in a stopped state at a position before a predetermined target stop position, and whether a difference between the detection position and the target stop position is equal to or smaller than a threshold difference, based on a detection position of the moving unit, after the moving unit starts deceleration operation, and switch a control of the driving unit to a position control based on the difference between the detection position and the target stop position, from a speed control based on a designated speed associated with the detection position to the target stop position, if the moving unit is in the stopped state at a position before the predetermined target stop position, and the difference is equal to or smaller than the threshold difference.

13 Claims, 10 Drawing Sheets

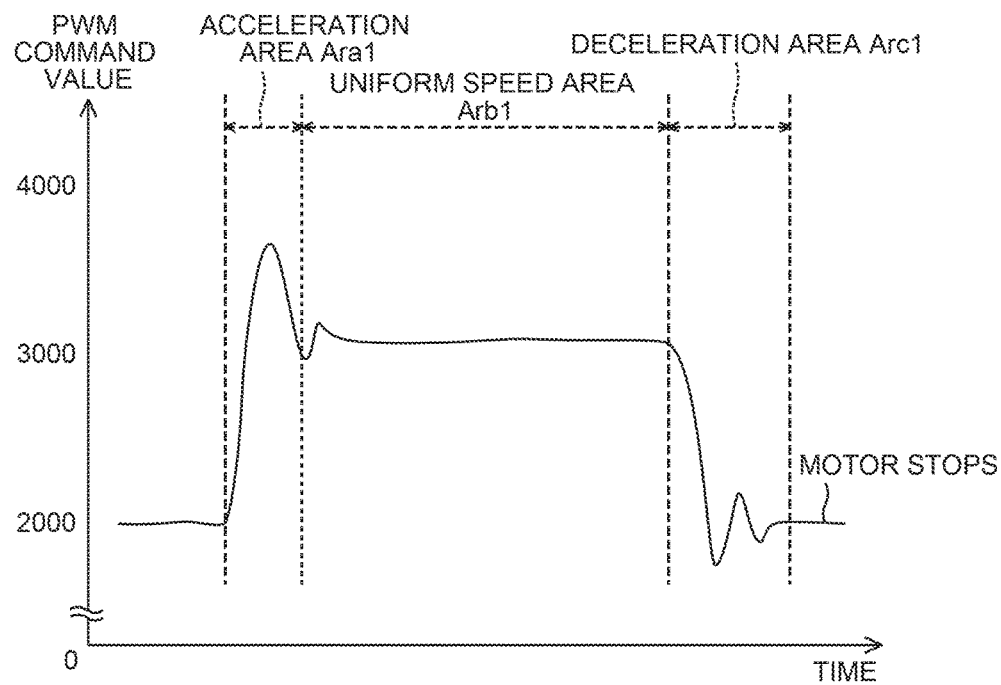
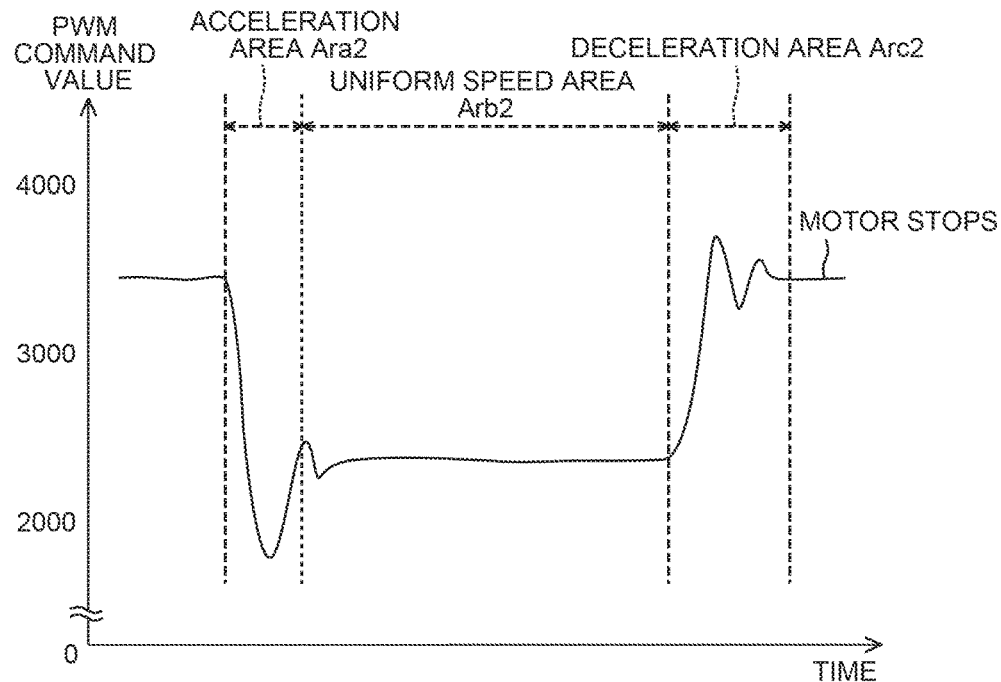

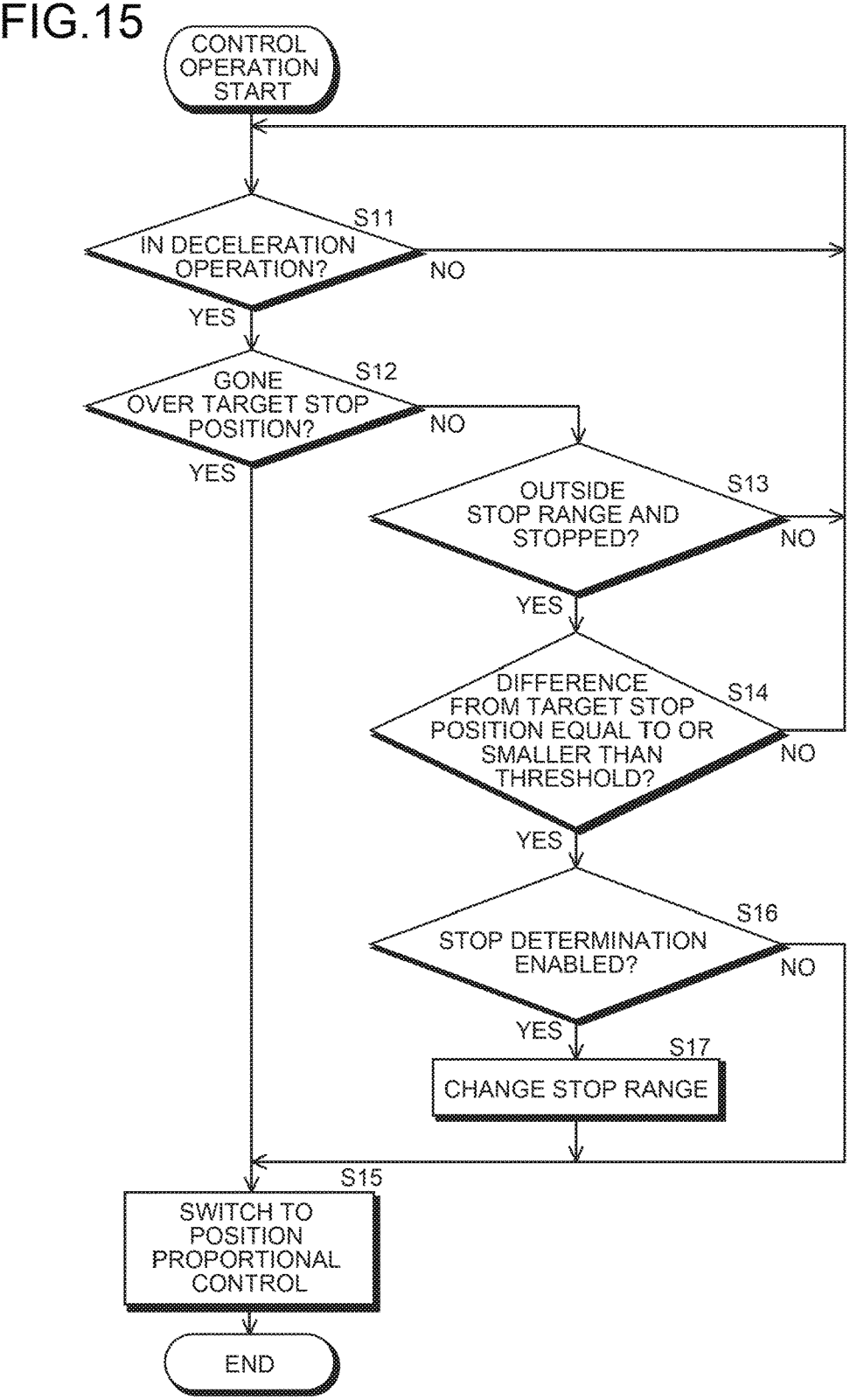

MOVEMENT CONTROL DEVICE, INK-DROPLET EJECTION DEVICE, MOVEMENT CONTROL METHOD, AND RECORDING MEDIUM

CROSS-REFERENCE TO RELATED APPLICATIONS

The present application claims priority under 35 U.S.C. § 119 to Japanese Patent Application No. 2016-018437, filed Feb. 2, 2016 and Japanese Patent Application No. 2016-229338, filed Nov. 25, 2016. The contents of which are incorporated herein by reference in their entirety.

BACKGROUND OF THE INVENTION

1. Field of the Invention

The present invention relates to a movement control device, an ink-droplet ejection device, a movement control method, and a recording medium.

2. Description of the Related Art

In inkjet image forming apparatuses and the like, a movement control device that controls a motor or the like that moves a moving unit such as a carriage to hold an ink head and the like has been known. Such a movement control device, in speed control of the moving unit, reduces the speed after uniform speed movement, and when the moving unit runs over a target stop position, switches to position control based on a position of the moving unit to stop the moving unit at the target stop position (Japanese Patent No. 4481121).

However, the above technique has a problem that the moving unit cannot be stopped at the target stop position if the moving unit stops before reaching the target stop position due to a mechanical load, such as torque unevenness caused by cogging torques of a motor and the like, friction at s stop position of the carriage, and variation in sliding loads.

SUMMARY OF THE INVENTION

According to one aspect of the present invention, a movement control device includes a detecting unit and a drive control unit. The detecting unit is configured to detect a position of a moving unit that is moved by a driving unit. The drive control unit is configured to control the driving unit based on a detection position of the moving unit detected by the detecting unit. The drive control unit is configured to determine whether the moving unit is in a stopped state at a position before a predetermined target stop position, and whether a difference between the detection position and the target stop position is equal to or smaller than a threshold difference, based on the detection position, after the moving unit starts deceleration operation, and perform switching control to switch a control of the driving unit to a position control based on the difference between the detection position of the moving unit and the target stop position, from a speed control based on a designated speed that is associated with the detection position of the moving unit to the target stop position, if the moving unit is in the stopped state at a position before the predetermined target stop position, and the difference is equal to or smaller than the threshold difference.

BRIEF DESCRIPTION OF THE DRAWINGS

FIG. 4 is a graph illustrating a change in a pulse width modulation (PWM) command value to control a main scanning motor in forward movement in one scanning of the carriage;

FIG. 5 is a graph illustrating a change in the PWM command value to control the main scanning motor in reverse movement in one scanning of the carriage;

FIG. 15 is a flowchart of another stop-position keeping control at the time of low speed movement by the motor control unit illustrated in FIG. 12.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
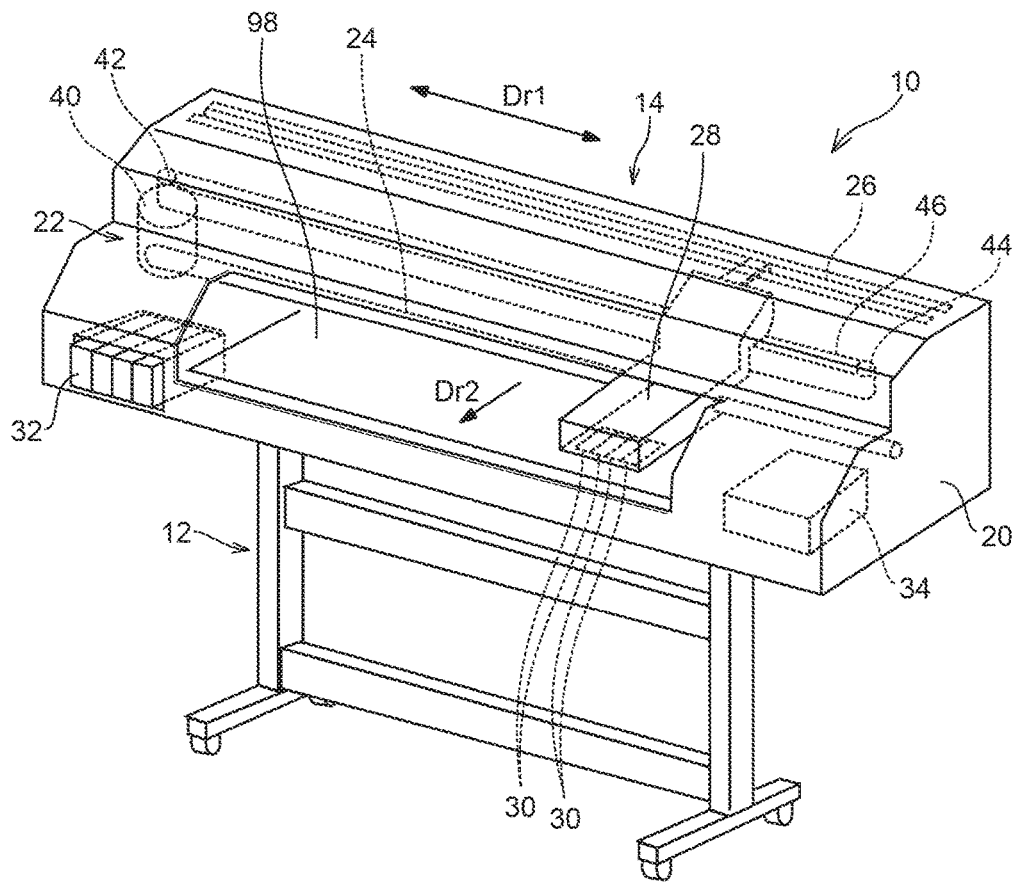
FIG. 1 is a perspective view illustrating an entire configuration of an image forming apparatus of an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a movement control device, an ink-droplet ejection device, a movement control method, and a program that are capable of stopping an object at a target stop position.

Following exemplary embodiments and modifications include common components. Therefore, in the following, like reference symbols are assigned to like components, and duplicated explanation is partially omitted. A part included in an embodiment and modification can be replaced with a corresponding part in another embodiment and modification. Moreover, a configuration and a position of a part included in an embodiment and modification are the same as in another embodiment and modification, unless otherwise specified.

FIG. 1 is a perspective view illustrating an entire configuration of an image forming apparatus 10 according to an embodiment. Directions indicated by an arrow Dr1 and an arrow Dr2 in FIG. 1 are a main scanning direction and a sub-scanning direction, respectively. The image forming apparatus 10 is, for example, a serial type inkjet recording apparatus. As illustrated in FIG. 1, the image forming apparatus 10 includes a main unit frame 12 and a recording device 14.

The main unit frame 12 is placed on a floor, or the like. The main unit frame 12 is provided at a lower portion of the recording device 14. The main unit frame 12 supports the recording device 14.

The recording device 14 is one example of an ink-droplet ejection device, and forms an image on a recording medium 98, such as a print paper sheet. The recording device 14 includes a casing 20, a driving mechanism 22, a guide rod 24, a sub guide rod 26, a carriage 28 as one example of a moving unit, plural (for example, four) ink heads 30 as one example of an ink-droplet ejecting unit, a cartridge 32, and a maintenance mechanism 34.

The casing 20 houses and holds internal components of the recording device 14, such as the driving mechanism 22, the guide rod 24, the sub guide rod 26, and the carriage 28.

The driving mechanism 22, which is an example of a driving unit, moves the carriage 28 in the main scanning direction. The driving mechanism 22 includes a main scanning motor 40, a driving pulley 42, a driven pulley 44, and a timing belt 46.

An output axis of the main scanning motor 40 is connected to the driving pulley 42. The main scanning motor 40 outputs a rotation drive force to move the carriage 28.

The driving pulley 42 is arranged at one end of the casing 20 in the main scanning direction. The driven pulley 44 is arranged at the other end of the casing 20 in the main scanning direction.

The timing belt 46 is looped over the driving pulley 42 to the driven pulley 44. Therefore, the timing belt 46 is arranged substantially parallel to the main scanning direction. Furthermore, tension is applied to the timing belt 46 by the driven pulley 44. Thus, the timing belt 46 is held by the driving pulley 42 and the driven pulley 44 without looseness.

The guide rod 24 and the sub guide rod 26 are provided in the casing 20 so as to extend in the main scanning direction. One end of the guide rod 24 and the sub guide rod 26 extends to a portion near the other end of the casing 20 in the main scanning direction. The other end of the guide rod 24 and the sub guide rod 26 extends to a portion near the other end of the casing 20 in the main scanning direction. The guide rod 24 is arranged at a different position from the sub guide rod 26 in the sub-scanning direction.

The carriage 28 is provided in the casing 20. The carriage 28 is connected to the timing belt 46. The carriage 28 is held so as to be movable in the main scanning direction by the guide rod 24 and the sub guide rod 26. That is, guided by the guide rod 24 and the sub guide rod 26 in the main scanning direction, the carriage 28 is moved by the timing belt 46.

The ink heads 30 are arranged in the carriage 28. The ink heads 30 move with the carriage 28.

The cartridge 32 contains ink. The cartridge 32 is provided in the casing 20 separately from the carriage 28. The cartridge 32 is connected to the ink heads 30 through pipes. The cartridge 32 supplies ink to the ink heads 30.

The maintenance mechanism 34 is provided inside the casing 20, and near one end of a region in which the carriage 28 can move. The maintenance mechanism 34 cleans the ink head 30 that has come above the maintenance mechanism 34 with the carriage 28.

Figure 2:
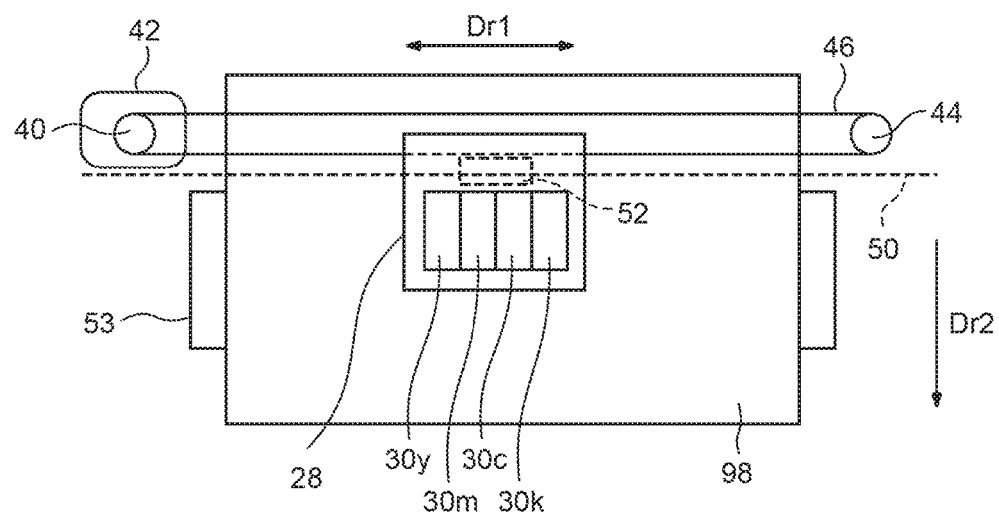
FIG. 2 is a plan view illustrating a structure near a carriage.

FIG. 2 is a plan view illustrating a structure near the carriage 28. As illustrated in FIG. 2, four units of the ink heads 30y, 30m, 30c, and 30k are aligned in the main scanning direction in the carriage 28. The ink head 30y ejects droplets of yellow ink to the recording medium 98. The ink head 30m ejects droplets of magenta ink to the recording medium 98. The ink head 30c ejects droplets of cyan ink to the recording medium 98. The ink head 30k ejects droplets of black ink to the recording medium 98. In the following explanation, a reference symbol of the ink heads the ink heads is "30" when it is not necessary to distinguish colors of the ink heads 30y, 30m, 30c, and 30k.

The storage device 14 further includes an encoder sheet 50, an encoder sensor 52, and a platen 53.

The encoder sheet 50 extends along the main scanning direction that is the moving direction of the carriage 28. The encoder sheet 50 is fixed to the casing 20, and the like. One example of the encoder sheet 50 is a linear scale that has multiple marks aligned along the main scanning direction.

The encoder sensor 52 is provided in the carriage 28. Therefore, the encoder sensor 52 moves along the main scanning direction with the carriage 28. The encoder sensor 52 detects a mark of the encoder sheet 50 fixed to the casing 20 and the like and outputs as encoder information, which is one example of information used in calculation of a position of the carriage 28, with the movement of the carriage 28.

The platen 53 is provided at a position opposing to the ink heads 30. The platen 53 supports the recording medium on which an image is recorded with ink ejected from the ink heads 30, while being moved intermittently in the sub-scanning direction.

In the image forming apparatus 10, when the main scanning motor 40 drives the driving pulley 42 to be rotated, the timing belt 46 makes reciprocating movement along the main scanning direction by the rotation drive, between the driving pulley 42 and the driven pulley 44. This makes the carriage 28 connected to the timing belt 46 make reciprocating movement along the main scanning direction together with the ink heads 30 and the encoder sensor 52. The encoder sensor 52 detects a mark of the encoder sheet 50 while moving with the carriage 28, and outputs as the encoder information. Furthermore, the ink heads 30 moving in the main scanning direction with the carriage 28 eject ink to the recording medium 98 that is moving in the sub-scanning direction, thereby recording an image on the recording medium 98.

Figure 3:
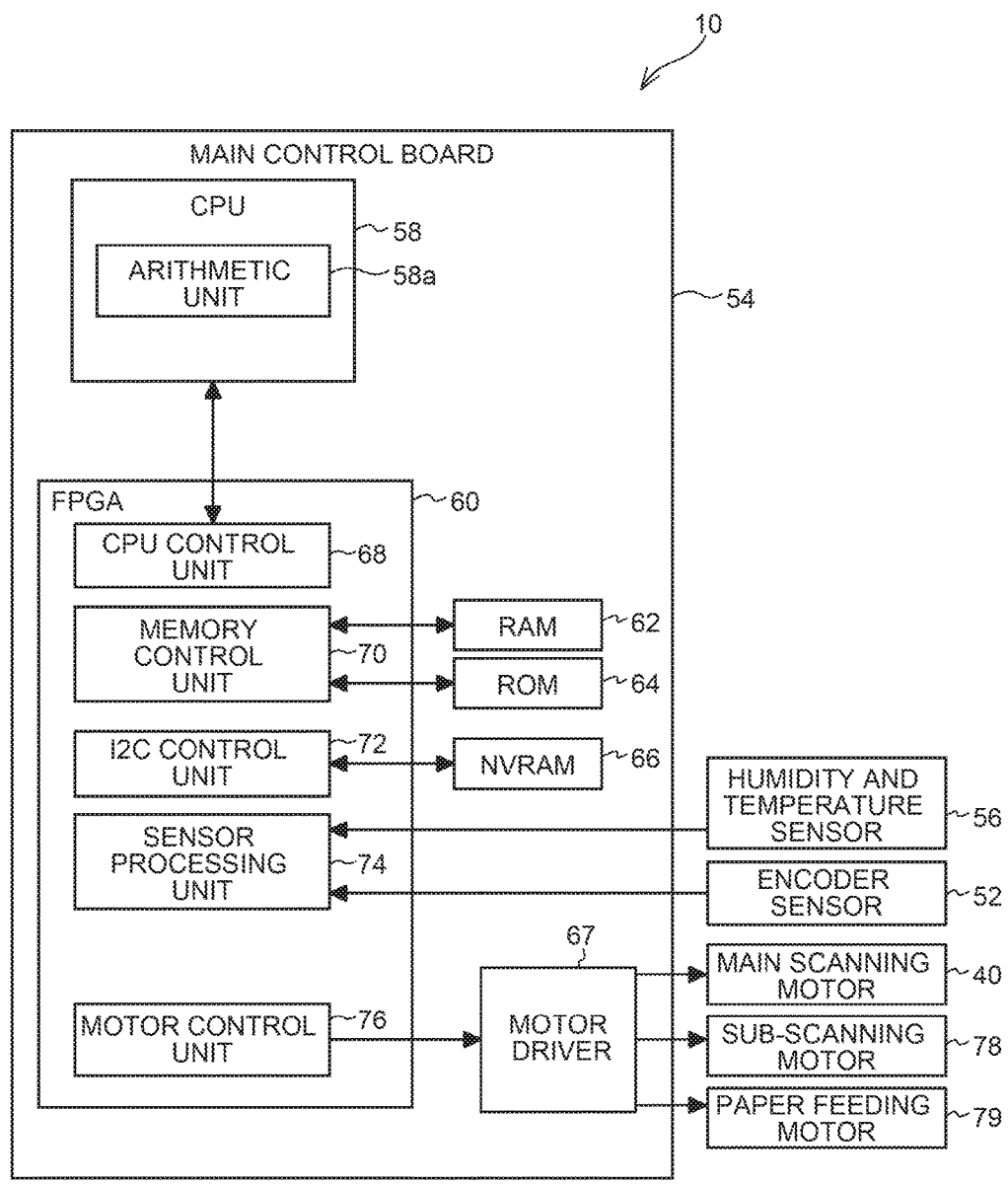
FIG. 3 is a block diagram of a control system of the image forming apparatus.

FIG. 3 is a block diagram of a control system of the image forming apparatus 10. As illustrated in FIG. 3, the image forming apparatus 10 further includes a main control board 54, which is one example of a movement control device, and a humidity and temperature sensor 56.

The main control board 54 is, for example, a computer. The main control board 54 includes a central processing unit (CPU) 58, a field-programmable gate array) FPGA 60, a random-access memory (RAM) 62, a read only memory (ROM) 64, a non-volatile RAM (NVRAM) 66, and a motor driver 67.

The CPU 58 performs overall control of the image forming apparatus 10. The CPU 58 includes an arithmetic unit 58*a* that performs various arithmetic computations in execution of a program. The CPU 58 is connected to the FPGA 60 so as to be able to input/output information to/from the FPGA 60. For example, the CPU 58 outputs a moving speed instruction, a moving distance instruction, and the like to control a drive of the main scanning motor 40 to a motor control unit 76 together with an operation start instruction to start an operation of the main scanning motor 40.

The FPGA 60 has a configuration enabling to integrate multiple logic circuits in one semiconductor chip, and to program the logic circuits. Specifically, circuit configuration data is stored in a non-volatile memory such as a flash memory connected to an external unit, and the circuit configuration data is transferred to a control memory inside the FPGA from an external memory, and the FPGA 60 thereby becomes an operable state.

The FPGA 60 includes a CPU control unit 68, a memory control unit 70, an inter-integrated circuit (I2C) control unit 72, and a sensor processing unit 74. The CPU control unit 68, the memory control unit 70, the I2C control unit 72, and the sensor processing unit 74 are preferable to be configured with a logic circuit of the FPGA 60 as described above for the purpose of increasing the processing speed.

Moreover, the FPGA 60 is equipped with a CPU core (soft core, microprocessor). In the present embodiment, software processing according to a program by the CPU core on the FPGA 60 is executed to implement the motor control unit 76, which is one example of a drive control unit.

The motor control unit 76 has been explained to be implemented by executing a program on the CPU core of the FPGA 60, but is not limited thereto, and may be implemented by hardware such as a logic circuit.

The CPU control unit 68 communicates with the CPU 58. The memory control unit 70 controls access to a memory, such as the RAM 62 and the ROM 64. The I2C control unit 72 communicates with the NVRAM 66.

The sensor processing unit 74 acquires humidity and temperature information that is output by the humidity and temperature sensor 56 to perform processing. Moreover, the sensor processing unit 74 includes a detecting unit 74*a* that acquires encoder information that is output by the encoder sensor 52, and detects a position of the carriage 28 that is moved by the driving mechanism 22 to output as position information. More specifically, the detecting unit 74*a* of the sensor processing unit 74 performs counter processing for number of pulses of the encoder information output by the encoder sensor 52 to calculate a position of the carriage 28 to obtain a detection position.

The motor control unit 76 controls the main scanning motor 40, the sub-scanning motor 78 that moves the recording medium 98 in the sub-scanning direction, and a direct current (DC) motor or a stepping motor, such as a paper feeding motor 79 that feeds the recording medium 98, through the motor driver 67.

Next, processing of the control system of the image forming apparatus 10 is explained.

In the image forming apparatus 10, the CPU 58 outputs a moving speed instruction, a moving distance instruction, and the like to the motor control unit 76 together with an operation start instruction. The motor control unit 76 generates a speed profile based on the moving speed instruction and the moving distance instruction. The CPU 58 may generate the speed profile and output the speed profile to the motor control unit 76. The motor control unit 76 calculates an PWM command value based on the speed profile and the encoder information that is acquired from the encoder sensor 52 through the detecting unit 74*a* of the sensor processing unit 74. The motor control unit 76 outputs the PWM command value to the motor driver 67. The motor driver 67 drives the main scanning motor 40 based on the PWM command value. The motor control unit 76 notifies the CPU 58 of end of processing, when the processing relating to control of the main scanning motor 40 is finished. When the CPU 58 acquires the notification of end of processing, the processing relating to a motor is ended. Similarly, the CPU 58 and the motor control unit 76 also control other motors, such as the sub-scanning motor 78. The CPU 58 performs counting processing of print quantity, and counting processing of the number of scanning of the main scanning motor 40, other than the control of the main scanning motor 40 and the like.

FIG. 4 is a graph illustrating one example of a change in the PWM command value to control a main scanning motor 40 in forward movement in one scanning of the cartridge 28. Although FIG. 4 is a graph about scanning of the carriage 28, a graph for the sub-scanning motor 78 is to be the same graph.

The motor control unit 76 calculates the PWM command value as illustrated in FIG. 4 per control cycle, based on the speed profiled generated from the moving speed instruction and the moving distance instruction acquired from the CPU 58. For example, the motor control unit 76 calculates a speed error Ve from a detected speed that is calculated based on a designated speed included in the speed profile and on the encoder information acquired from the encoder sensor 52 through the detecting unit 74*a* of the sensor processing unit 74.

The motor control unit 76 controls the main scanning motor 40 from a servosystem that includes a PI control loop including proportional (P) control and an integral (I) control. Specifically, the motor control unit 76 calculates the PWM command value by the PI control based on Equation (1) below including the speed error Ve.

$$PWM \text{ Command Value} = Kp \times Ve + Ki \times \int Ve \cdot dt \qquad (1)$$

Kp is a proportional control constant. Ki is an integral control constant. The motor control unit 76 can control the main scanning motor 40 by a proportional-integral-derivative (PID) control. The motor control unit 76 outputs the PWM command value to the motor driver 67. The motor driver 67 determines a voltage conversion and Duty ratio based on a relationship among the PWM command value, the voltage conversion, and the duty ratio illustrated in Table 1 below.

TABLE 1

| PWM Command Value | Voltage Conversion | Duty Ratio |
|---|---|---|
| 4000 | +24 V | 100% |
| 2000 | 0 V | 50% |
| 0 | −24 V | 0% |

The motor driver 67 controls drive of the main scanning motor 40 and movement of the carriage 28 in the main scanning direction based on the duty ratio. Specifically, the motor driver 67 controls the main scanning motor 40 based on the PWM command value that is indicated in an acceleration area Ara1 in FIG. 4. It is preferable that the motor driver 67 control the main scanning motor 40 such that the carriage 28 is accelerated gradually to suppress the noise, vibration, and the like caused by sudden acceleration of the carriage 28 soon after a start of driving of the main scanning motor 40.

Subsequently, when the carriage 28 reaches a target start position such as a print start position, the motor driver 67 controls the main scanning motor 40 so that the carriage 28 moves at a uniform speed based on the PWM command value that is indicated in a uniform speed area Arb1. The ink heads 30 ejects ink to record an image on the recording medium 98 in a state in which the carriage 28 is moving at a uniform speed. It is preferable that the motor driver 67 control the main scanning motor 40 to improve the recording accuracy of an image in the uniform speed area Arb1.

When recording of the image to the recording medium 98 is finished, the motor driver 67 reduces the speed of the main scanning motor 40 and stops the main scanning motor 40 based on the PWM command value calculated from the speed profile indicated in a deceleration area Arc1. It is preferable that the motor driver 67 control the main scanning motor 40 such that the carriage 28 gradually reduces the speed to suppress the noise, vibration, and the like caused by sudden deceleration. The motor control unit 76 performs stop determination processing to determine whether the carriage 28 has been settled at a predetermined target stop position that is a target position to stop the carriage 28.

FIG. 5 is a graph illustrating a change in the PWM command value to control the main scanning motor 40 in reverse movement in one scanning of the carriage 28. The motor control unit 76 calculates the PWM command value per control cycle also for an acceleration area Ara2, a uniform speed area Arb2, and a deceleration area Arc2 illustrated in FIG. 5 by the PI control based on the speed error Ve and Equation (1), to output to the motor driver 67. The motor driver 67 calculates the duty ratio based on the PWM command value illustrated in FIG. 5, and controls the main scanning motor 40 to make the carriage 28 make a reverse operation in the main scanning direction.

Figure 6:
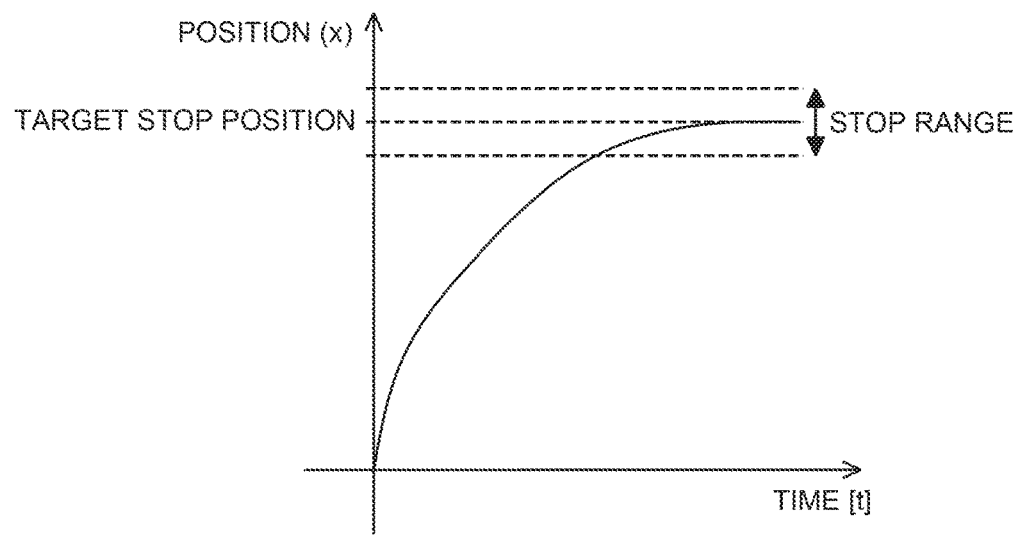
FIG. 6 is a graph that explains a change of a position in normal operation in a low speed area before the carriage stops.

FIG. 6 is a graph illustrating a change of a position in normal operation in a low speed area before the carriage 28 stops. As illustrated in FIG. 6, in the normal operation in which a mechanical load abnormality, and the like do not affect the carriage 28, the carriage 28 moved by the main scanning motor 40 reaches a target stop position that is included in a predetermined stop range by the PWM command value calculated by the motor control unit 76 described above.

Figure 7:
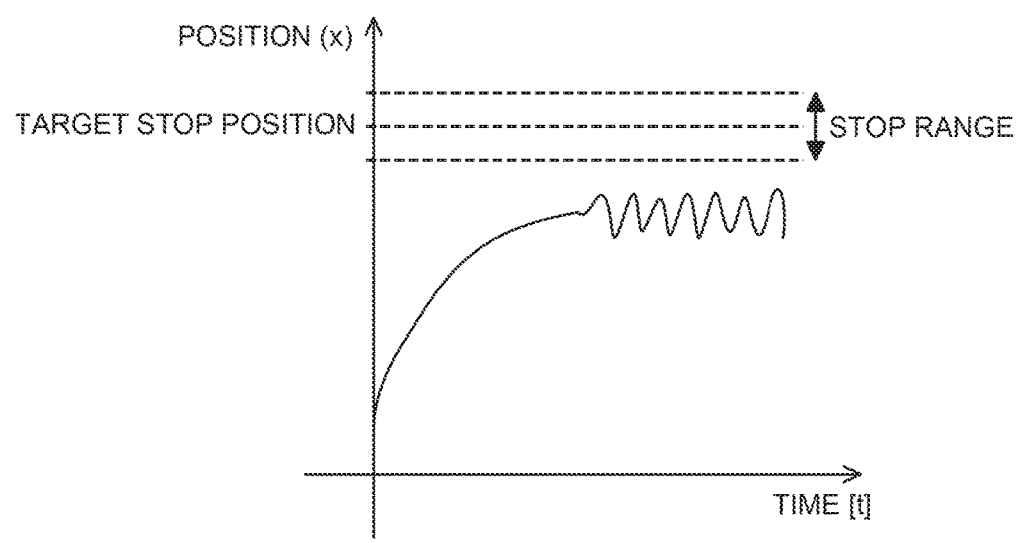
FIG. 7 is a graph that explains a change of a position in abnormal operation in the low speed area before the carriage stops.
Figure 8:
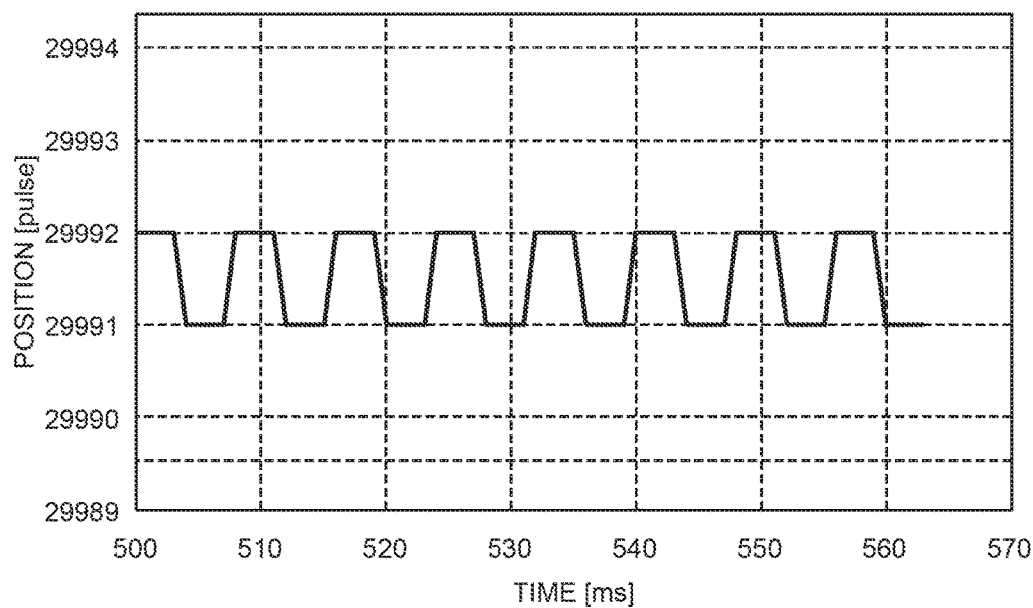
FIG. 8 is a graph in which an abnormal operation time period in the low speed area of the carriage is enlarged.

FIG. 7 is a graph illustrating a change of a position in abnormal operation in the low speed area before the carriage 28 stops. FIG. 8 is a graph in which an abnormal operation time period in the low speed area of the carriage 28 is enlarged. 1 [pulse] illustrated in FIG. 8 is 84.67 micrometers (μm) (300 lines per inch (LPI)).

As illustrated in FIG. 7 and FIG. 8, when a mechanical load affects the carriage 28, and in an abnormal operation when a cogging torque occurs in the main scanning motor 40, or the like, the carriage 28 moved by the main scanning motor 40 makes a reciprocating movement in a certain area, and stops at a position outside the stop range in which the target stop position is included.

Figure 9:
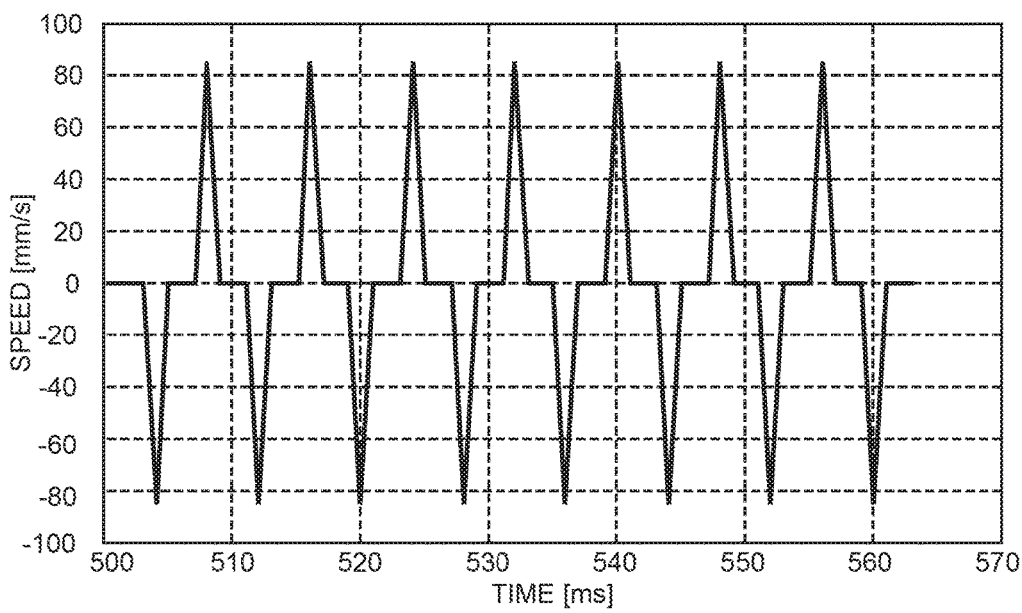
FIG. 9 is a graph that explains a change in a detected speed in abnormal operation in the low speed area before the carriage stops.

FIG. 9 is a graph illustrating a change in a detected speed in abnormal operation in the low speed area before the carriage 28 stops. In the low speed area in which a position of the carriage 28 as illustrated in FIG. 8, the motor control unit 76 calculates a detected speed as illustrated in FIG. 9, and a correct speed of the carriage 28 cannot be acquired. Therefore, when the motor control unit 76 cannot output the PWM command value with a certain output or higher. Thus, the carriage 28 can make unstable movement of moving back and forth between certain positions due to a balance with a load or the like.

Figure 10:
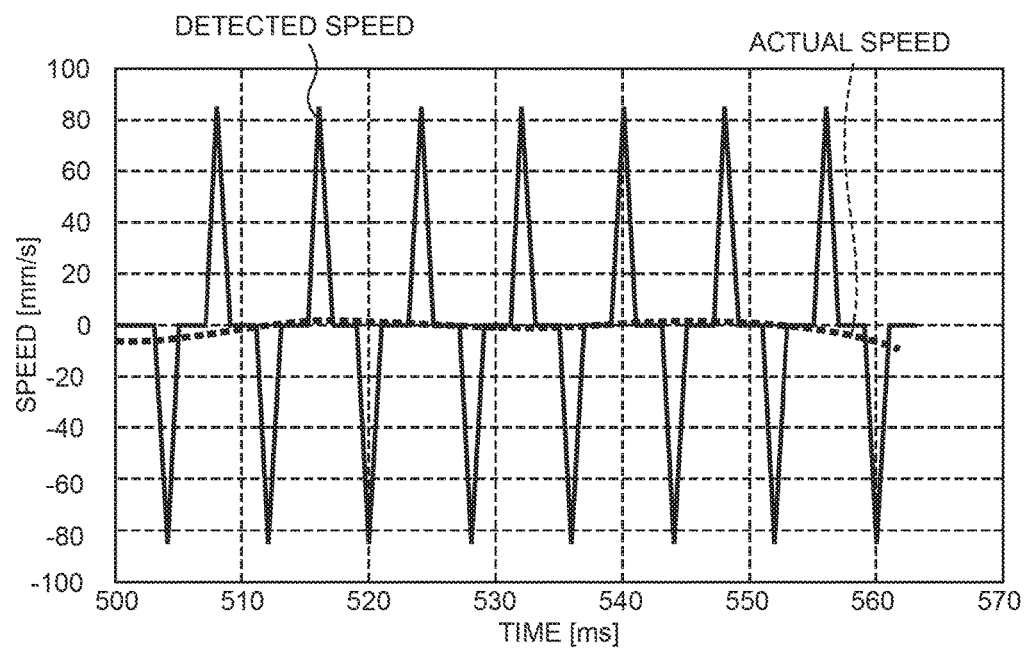
FIG. 10 is a graph that explains a relationship between an actual speed of the carriage and the detected speed.

FIG. 10 is a graph illustrating a relationship between an actual speed and the detected speed of the carriage 28. One example of a reason why a correct detected speed cannot be acquired is a resolution of sampling. For example, the motor control unit 76 determines that the position of the carriage 28 has not changed when not even one pulse is acquired from the encoder sensor 52 within one sampling cycle. In this case, the motor control unit 76 calculates a detected speed including 0 millimeters (mm)/second (s) partially as indicated by a solid line in FIG. 10. Therefore, the detected speed differs from the actual speed of the carriage 28 that is moving at a low speed as indicated by a bold dotted line in FIG. 10.

Specifically, in the case of the PI control (or PID control) in which sampling is performed every 1 millisecond (ms), a speed of the carriage 28 for which the motor control unit 76 can acquire one pulse or more per 1 ms for sure is 84 mm/s or higher. When the resolution of the minimum speed is 84 mm/s as this case, the motor control unit 76 cannot calculate a correct speed of the carriage 28 as a detected speed, including speeds near the speed.

Therefore, the motor control unit 76 calculates a detected speed as ±84 mm/s if a pulse is acquired from the encoder sensor 52, and calculates a detected speed as 0 mm/s if a pulse is not acquired. Thus, the motor control unit 76 calculates a detected speed that is different from the fluctuating (for example, linearly fluctuating) actual speed of the carriage 28 as indicated by the bold dotted line. If variations in a mechanical load, delay in a moving time, and the like occur in such a state, the carriage 28 makes unstable movement.

Figure 11:
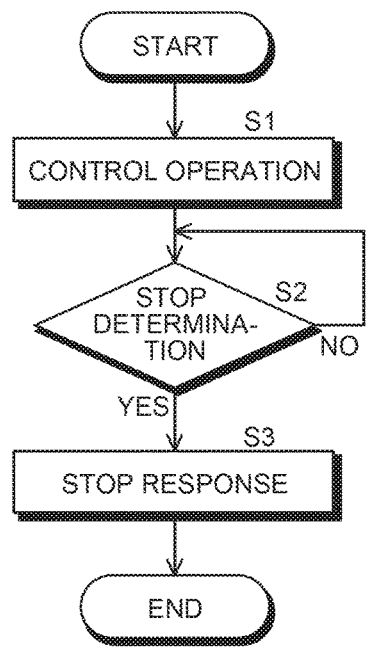
FIG. 11 is a flowchart of a control of the main scanning motor by a motor control unit.

FIG. 11 is a flowchart of a control of the main scanning motor 40 by the motor control unit 76. As illustrated in FIG. 11, acquiring an operation start instruction from the CPU 58, the motor control unit 76 starts a control operation for the main scanning motor 40 by feedback control (S1). Specifically, the motor control unit 76 generates a speed profile from the moving speed instruction and the moving distance instruction that are acquired from the CPU 58 together with the operation start instruction. The motor control unit 76 generates the PWM command value based on the speed profile, and on the encoder information that is acquired from the encoder sensor 52 through the detecting unit 74a of the sensor processing unit 74, and performs feedback control of the main scanning motor 40 through the motor driver 67. The operation of the main scanning motor 40 by the motor driver 67 includes the acceleration operation, the uniform speed operation, the deceleration operation, and a positioning operation.

The motor control unit 76 determines whether the carriage 28 has stopped within a stop range that is prescribed by a predetermined range including a target stop position (S2). For example, the stop range is a range of ±5 pulses relative to the target stop position. The motor control unit 76 determines, for example, whether the carriage 28 is positioned within the stop range for a predetermined period of time (for example, 10 ms) or more, thereby determining whether the carriage 28 has stopped. Determining that the carriage 28 has not stopped within the stop range (S2: NO), the motor control unit 76 continues the control operation for the main scanning motor 40 by the feedback control at step S1. On the other hand, when the carriage 28 stops and stays in the stop range for a predetermined time or longer, the motor control unit 76 determines as stop (S2: YES), and outputs a stop response to the CPU 58 (S3). The motor control unit 76 can continue the control operation for the main scanning motor 40 also while outputting the stop response. Thereafter, the motor control unit 76 ends the control of the main scanning motor 40 when a next operation instruction or a stop instruction is acquired from the CPU 58, and performs a next processing.

Figure 12:
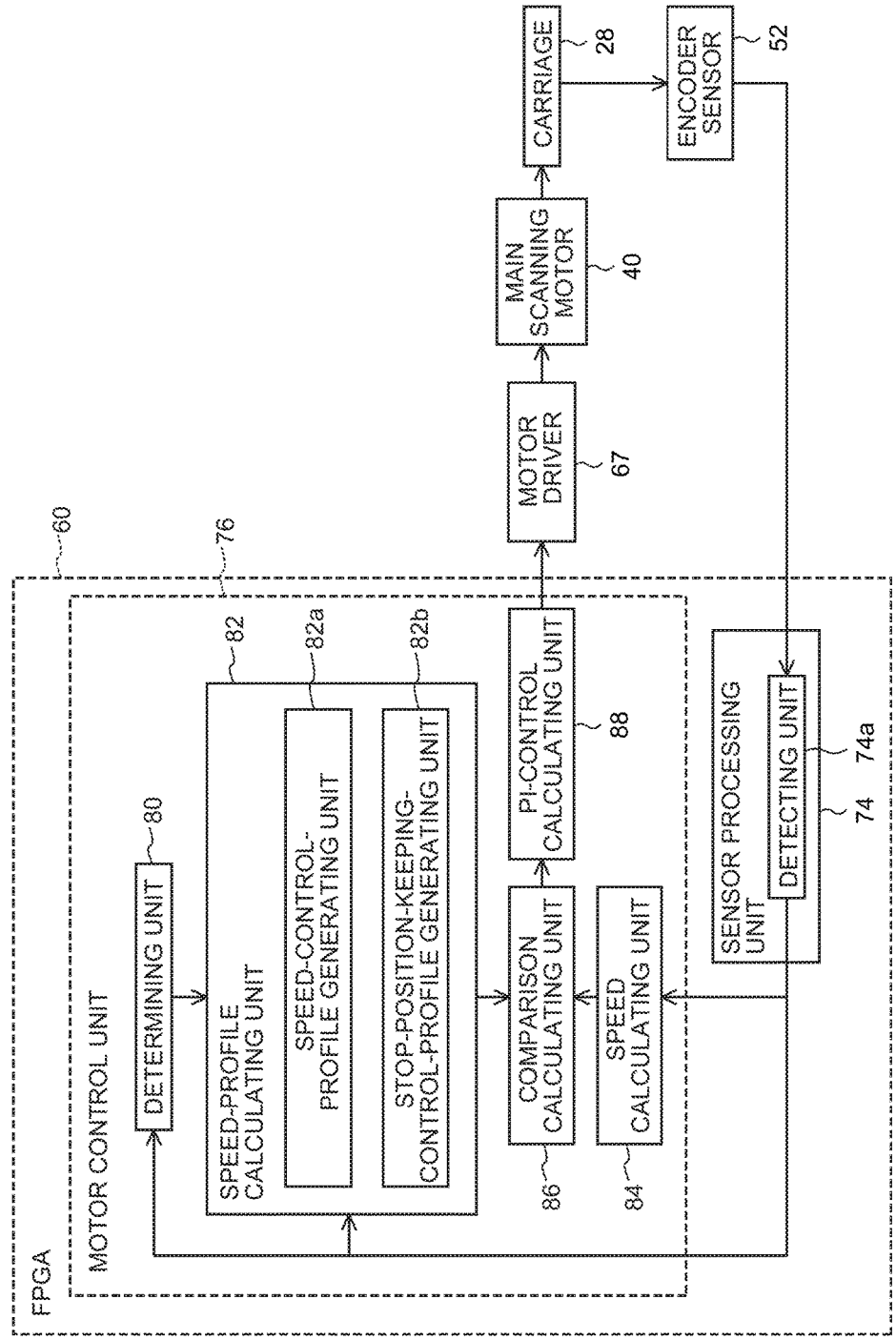
FIG. 12 is a block diagram illustrating details of a control system of the motor control unit.

FIG. 12 is a block diagram illustrating details of the control system of the motor control unit 76. As illustrated in FIG. 12, the motor control unit 76 includes a determining unit 80, a profile calculating unit 82 that is an example of a switching unit, a speed calculating unit 84, a comparison calculating unit 86, and a PI-control calculating unit 88. When the motor control unit 76 selects the PWM command value by the PID control, the PI-control calculating unit 88 is to be a PID-control calculating unit.

The determining unit 80 performs various kinds of determinations in the motor control unit 76. For example, the determining unit 80 determines whether to cause the profile calculating unit 82 to switch the control of the main scanning motor 40 that is an object of control from the speed control described later to the position control (for example, the position proportional control). Specifically, the determining unit 80 causes to switch the control of the main scanning motor 40 based on whether the carriage 28 has stopped before reaching the target stop position, and whether a difference between a detection position and the target stop position is equal to or smaller than a threshold difference based on the detection position of the carriage 28 calculated by the detecting unit 74*a* of the sensor processing unit 74 from encoder information that is detected by the encoder sensor 52 after the carriage 28 moved by the main scanning motor 40 starts the deceleration operation. For example, when the determining unit 80 determines that the carriage 28 has stopped before reaching the target stop position, and whether a difference between a detection position and the target stop position is equal to or smaller than a threshold difference based on the detection position of the carriage 28 calculated by the detecting unit 74*a* of the sensor processing unit 74 from encoder information that is detected by the encoder sensor 52 after the carriage 28 moved by the main scanning motor 40 starts the deceleration operation, the determining unit 80 outputs a switching instruction to the profile calculating unit 82, to make the profile calculating unit 82 switch the control of the main scanning motor 40 from the speed control to the position control.

The profile calculating unit 82 generates a speed profile, to control the main scanning motor 40. The profile calculating unit 82 includes a speed-control-profile generating unit 82*a*, and a stop-position-keeping-control-profile generating unit 82*b*.

The speed-control-profile generating unit 82*a* generates a speed control profile that is one of the speed profile, and is used in the speed control. The speed-control-profile generating unit 82*a* generates the speed control profile including a designated speed that is associated with a detection position of the carriage 28 based on the setting speed included in the moving speed instruction and a distance to the target stop position included in and the moving distance instruction acquired from the CPU 58. The setting speed is, for example, a constant speed (that is, a uniform speed) in the uniform speed area. The detection position is, for example, a position obtained relative to the movement start position of the carriage 28. The detection position can be a value corresponding to a position of the number of pulses in the encoder information acquired from the encoder sensor 52. The designated speed includes a speed for acceleration in the acceleration area before the uniform speed area, a speed for uniform speed (that is, setting speed) in the uniform speed area, and a speed for deceleration in the deceleration area after the uniform speed area. The designated speed in the speed control profile is assigned, associated with a detection position of the carriage 28 up to the target stop position. The speed-control-profile generating unit 82*a* outputs the designated speed in the speed control profile that is associated with the detection position of the carriage 28 calculated by the detecting unit 74*a* of the sensor processing unit 74 from the encoder information to the comparison calculating unit 86.

The stop-position-keeping-control-profile generating unit 82*b* generates a stop-position-keeping control profile that is one of the speed profile, and is used in the position proportional control. The stop-position-keeping-control-profile generating unit 82*b* generates the stop-position-keeping control profile based on the designated speed associated with the difference between the detection position of the carriage 28 calculated by the detecting unit 74*a* of the sensor processing unit 74 from the encoder information and the target stop position. For example, the stop-position-keeping-control-profile generating unit 82*b* generates the stop-position-keeping control profile including designated speeds illustrated in Table 2, based on Equation (2) below that includes the difference between the detection position and the target stop position.

Designated Position in Stop-Position-Keeping Control Profile=Difference between Detection position and Target Stop Position×Position Proportional Constant (2)

TABLE 2

| Difference from Target Stop Position [pulse] | Position Proportional Constant | Designated Speed [mm/s] |
| --- | --- | --- |
| 5 | 3 | 15 |
| 4 | 3 | 12 |
| 3 | 3 | 9 |
| 2 | 3 | 6 |
| 1 | 3 | 3 |
| 0 | 3 | 0 |
| −1 | 3 | −3 |
| −2 | 3 | −6 |
| −3 | 3 | −9 |
| −4 | 3 | −12 |
| −5 | 3 | −15 |

As illustrated in Table 2, when a difference between a detection position of the carriage 28 and the target stop position is 0 pulses, the designated speed is to be 0 mm/s. Therefore, the stop-position-keeping-control-profile generating unit 82*b* generates the stop-position-keeping control profile to converge the position of the carriage 28 to the target stop position as the speed profile to keep the stop position in the position proportional control. In this way, the stop-position-keeping-control-profile generating unit 82*b* proportionates the speed profile to a position difference to perform the position proportional control as a target position keeping control. The stop-position-keeping-control-profile generating unit 82*b* outputs the designated speed in the stop-position-keeping control profile associated with the difference between the detection position of the carriage 28 calculated by the detecting unit 74*a* of the sensor processing unit 74 from the encoder information and the target stop position, to the comparison calculating unit 86.

Acquiring the switching instruction from the determining unit 80, the profile calculating unit 82 performs switching control to switch the control of the main scanning motor 40 from the speed control by the speed-control-profile generating unit 82a to the position proportional control by the stop-position-keeping-control-profile generating unit 82b.

The speed calculating unit 84 calculates a detected speed of the carriage 28 based on the detection position of the carriage 28 calculated from the encoder information that is acquired from the encoder sensor 52 by the detecting unit 74a of the sensor processing unit 74 that is provided inside the FPGA 60 and that performs the counting processing. The speed calculating unit 84 outputs the calculated detected speed of the carriage 28 to the comparison calculating unit 86.

The comparison calculating unit 86 calculates the speed error Ve that is the difference between the designated speed included in the speed control profile or the stop-position-keeping control profile acquired from the profile calculating unit 82 and the detected speed of the carriage 28. The comparison calculating unit 86 outputs the speed error Ve to the PI-control calculating unit 88.

The PI-control calculating unit 88 generates the PWM command value by the PI control using the speed error Ve. The PI-control calculating unit 88 outputs the PWM command value to the motor driver 67. As described, in the position proportional control, the PWM command value can be output even when the speed information acquired from the encoder information is 0, or cannot be acquired accurately.

Figure 13:
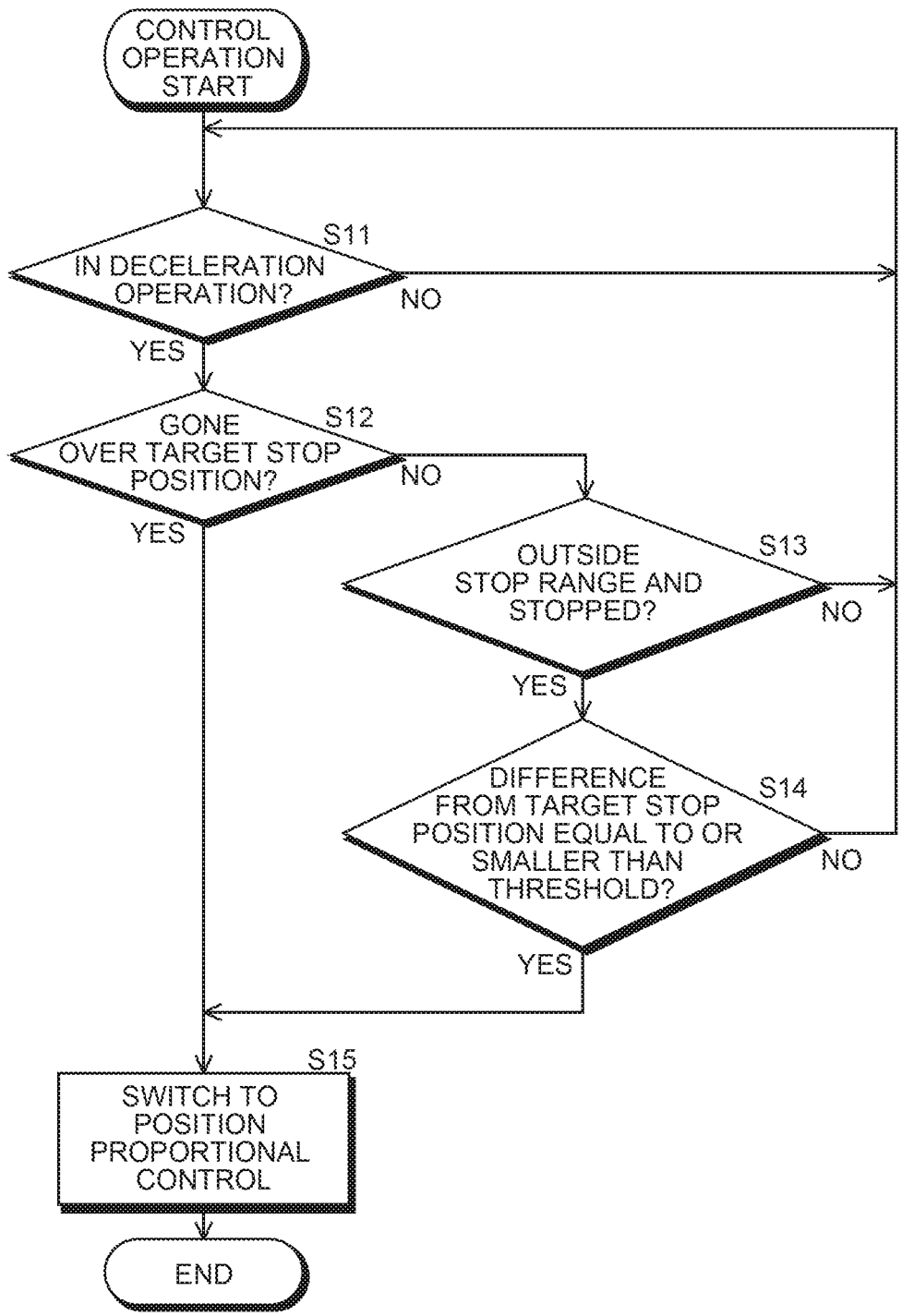
FIG. 13 is a flowchart of a stop-position keeping control at the time of low speed movement by the motor control unit illustrated in FIG. 12.

FIG. 13 is a flowchart of a stop-position keeping control at the time of low speed movement by the motor control unit 76 illustrated in FIG. 12. As illustrated in FIG. 13, the determining unit 80 determines whether the main scanning motor 40 is during the deceleration operation in the speed control in the control operation at S1 (step S11). The deceleration operation includes the speed control by the speed-control-profile generating unit 82a. For example, the determining unit 80 determines whether it is during the deceleration operation based on the detection position of the carriage 28 calculated by the detecting unit 74a of the sensor processing unit 74 from the encoder information that is acquired from the encoder sensor 52. The determining unit 80 repeats step S11 until it is determined to be during the deceleration operation (S11: NO).

Determining that it is during the deceleration operation (S11: YES), the determining unit 80 determines whether the carriage 28 has gone over the target stop position based on the detection position of the carriage 28 calculated by the detecting unit 74a of the sensor processing unit 74 from the encoder information acquired from the encoder sensor 52 (S12). Determining that the carriage 28 has gone over the target stop position (S12: YES), the determining unit 80 switches from the speed control by the speed-control-profile generating unit 82a to the position proportional control by the stop-position-keeping-control-profile generating unit 82b to control the main scanning motor 40, and thus keeps the carriage 28 at the stop position (S15).

On the other hand, determining that the carriage 28 has not gone over the target stop position (S12: NO), the determining unit 80 determines whether the detection position of the carriage 28 is outside the stop range, and the carriage 28 has stopped (S13) if it is not during the stop determination at step S2 in FIG. 11. For example, the determining unit 80 determines whether the carriage 28 is outside the stop range, based on whether the carriage 28 is position within a predetermined range (for example, range of −5 pulses) from the target stop position based on the detection position of the carriage 28 calculated by the detecting unit 74a of the sensor processing unit 74 from the encoder information. Moreover, the determining unit 80 determines whether the carriage 28 has stopped based on a determination time in which the number of pulses included in the encoder information indicating movement of the carriage 28 continues to be equal to or less than the number of pulses for determination. The number of pulses for determination is set to a value not 0, that is, 1 or more (for example, 2 pulses) in advance. The determination time is predetermined time period, and is, for example, 10 ms. Specifically, the determining unit 80 determines that the carriage 28 has stopped when the carriage 28 has continued to make movement of the predetermined number of pulses for determination or less for the determination time since previous sampling. Thus, the determining unit 80 can determine as the stop state even when the carriage 28 becomes in a swinging state in which the carriage 28 moves back and forth between certain positions as illustrated in FIG. 8. If the number of pulses for determination is 0, the determining unit 80 determines as stop when a state of 0 pulses continues for 10 ms, that is only when the carriage 28 completely stops.

Furthermore, the determining unit 80 can set a reference time to a point of time when the carriage 28 had passed through a reference position that is between a position indicated in the deceleration area before starting the deceleration operation and the target stop position, and is before the target stop position, and can determine that the carriage 28 is in a stopped state when the carriage 28 has stayed at a position before the target stop position for a threshold time or more since the reference time. The reference position is before the target stop position by a predetermined distance (for example, 1 mm). The threshold time is determined in advance according to a normal time that is time required until passing through or stopping at the target stop position starting from the reference position when there is no abnormality. For example, in the case of the normal time being 100 ms, the determining unit 80 can determine that the carriage 28 has stopped, when the carriage 28 has not reached the target stop position even when 200 ms of the threshold time have passed since the reference time at which the carriage 28 had passed the reference position.

Determining that the carriage 28 is outside the stop range and has stopped (S13: YES), the determining unit 80 determines whether a difference between the detection position of the carriage 28 calculated by the detecting unit 74a of the sensor processing unit 74 from the encoder information and the target stop position is equal to or smaller than the predetermined threshold difference (S14). The threshold difference is a difference value that is allowable as the operation of the carriage 28 in the position proportional control. Thus, even when an initial difference is large, it is possible to suppress an impulsive sound caused by sudden application of a force, and to avoid being beyond the limit of the output range of the PWM command value (24 volts (V) and 4000 in Table 1). Moreover, the threshold difference enables to prevent the carriage 28 from colliding against a side wall as a result of the carriage 28 over running the target stop position, exceeding a distance corresponding to the allowable value.

Determining that the difference is equal to or smaller than the threshold difference (S14: YES), the determining unit 80 outputs the switching instruction to the profile calculating unit 82. Thus, the profile calculating unit 82 performs the switching control to switch from the speed control by the speed-control-profile generating unit 82a to the position proportional control by the stop-position-keeping-control-profile generating unit 82b, and controls the main scanning motor 40 by the position proportional control, to keep the carriage 28 at the stop position (S15).

Determining that the carriage 28 is not outside the stop range, or that the carriage 28 has not stopped at step S13 (S13: NO), the determining unit 80 repeats the processing at step S11 and later. In other words, when determining that the carriage 28 is in the stopped state at a position before the target stop position, and is outside the stop range in which the target stop position is included, the determining unit 80 maintains the speed control without performing the switching control. Moreover, determining that the difference is equal to or smaller than the threshold difference at step S14 (S14: NO), the determining unit 80 repeats the processing at step S11 and later.

Figure 14:
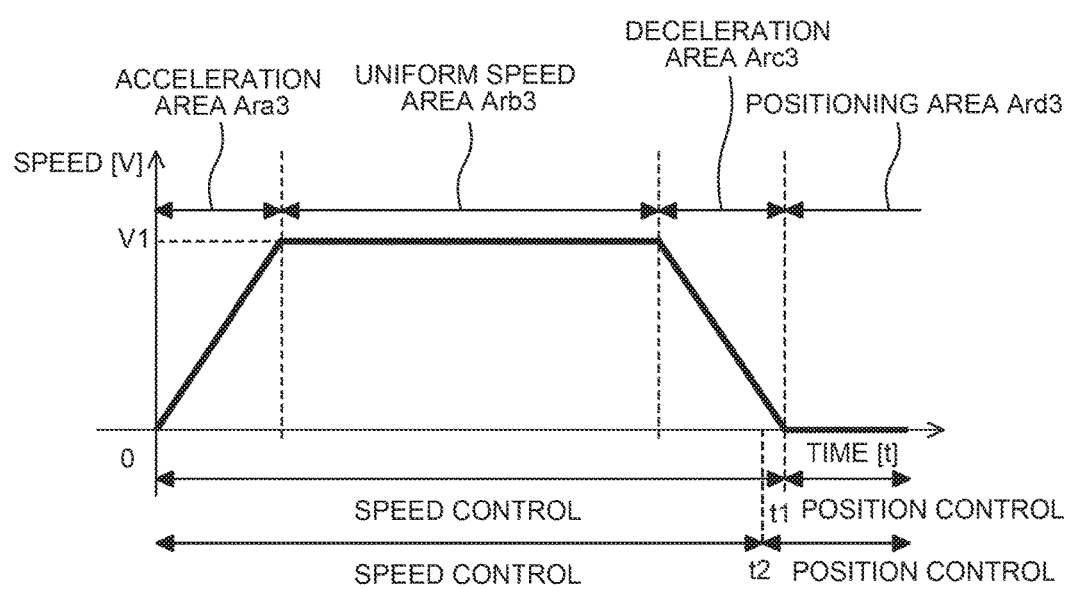
FIG. 14 is a graph s illustrating a speed profile.

FIG. 14 is a graph illustrating the speed profile. As illustrated in FIG. 14, the motor control unit 76 generates a speed profile that includes an acceleration area Ara3, a uniform speed area Arb3 in which the carriage 28 is moved at a speed V1, a deceleration area Arc3, and a positioning area Ard3.

The speed-control-profile generating unit 82a generates the speed control profile as the speed profile in the speed control including the acceleration area Ara3, the uniform speed area Arb3, and the deceleration area Arc3.

The stop-position-keeping-control-profile generating unit 82b generates the stop-position-keeping control profile as the speed profile in the position control of the positioning area Ard3, and converges the position of the carriage 28 to the target stop position. The stop-position-keeping-control-profile generating unit 82b generates the stop-position-keeping control profile to perform the position proportional control when the carriage 28 runs over the target stop position, as indicated at time t1 and later. Furthermore, the stop-position-keeping-control-profile generating unit 82b of the present embodiment generates the stop-position-keeping control profile to start the position proportional control according to a determination result made by the determining unit 80 also in the deceleration area Arc3 before reaching the target stop position as illustrated at time t2 and later.

As described above, in the motor control unit 76 of the main control board 54 of the embodiment, when the determining unit 80 determines that the carriage 28 has stopped even if the carriage 28 is at a position before the target stop position, and that the difference between the detection position of the carriage 28 and the target stop position is equal to or smaller than the threshold difference, the determining unit 80 switches from the speed control based on the detection position to the position proportional control based on the difference between the detection position and the target stop position. Thus, even when the carriage 28 in an unstable operation affected by a mechanical load, or the like stops at a position before the target stop position, the main control board 54 can stop the carriage 28 within the stop range. Moreover, as the main control board 54 switches to the position proportional control when the difference described above is equal to or smaller than the threshold difference, an impact caused by sudden acceleration soon after switching, and the like can be suppressed.

As the determining unit 80 determines that the carriage 28 has stopped when pulses as many as or more than the number of pulses for determination, which takes a value of 1 or larger, consecutively occurs, a state as illustrated in FIG. 8 can also be determined as the stopped state, not only when the carriage 28 has completely stopped. Therefore, the determining unit 80 can switch the control of the main scanning motor 40 to the position proportional control, determining the stop of the carriage 28 more appropriately.

Note that also when the stop of the carriage 28 is determined based on the reference time at which the carriage 28 passes through the reference position, the state as illustrated in FIG. 8 can be determined as the stop.

As the determining unit 80 switches to the position proportional control when determining that the carriage 28 has stopped outside the stop range at a position before the target stop position, it is possible to move the carriage 28 outside the stop range to the target stop position with high accuracy to perform the stop determination. On the other hand, when the determining unit 80 determines that the carriage 28 has stopped at a position before the target stop position in the stop range, the speed control is continued without switching to the position proportional control. Therefore, omitting an unnecessary operation, the carriage 28 can be moved to the target stop position more swiftly, to perform the stop determination.

FIG. 15 is a flowchart of another stop-position keeping control at the time of low speed movement by the motor control unit 76 illustrated in FIG. 12. Note that the same reference symbols are assigned to a step of the same processing to the step illustrated in FIG. 13, and explanation thereof is omitted.

Determining that the difference is equal to or smaller than the threshold difference at S14 (S14: YES), the determining unit 80 determines whether the carriage 28 is a state enabling the stop determination (S16). For example, the determining unit 80 can determine whether the carriage 28 is at a position enabling the stop determination in the case of an idle-ejection operation instruction having a large allowance range for stop accuracy, not the normal intermitted operation instruction, based on the operation instruction from the CPU 58.

Specifically, when the carriage 28 is within a range allowable in the idle ejection operation if the difference between the detection position of the carriage 28 and the target stop position is ±20 pulses, the determining unit 80 determines whether the carriage 28 is within a range enabling the stop determination, setting the allowable range to ±20 pulses. The allowable range of the idle ejection operation is based on, for example, a width of an ejection ink receiving slot provided in the maintenance mechanism 34 illustrated in FIG. 1.

Determining that the stop determination of the carriage 28 is possible (S16: YES), the determining unit 80 changes to extend the stop range (S17), and outputs the switching instruction to the profile calculating unit 82. That is, the determining unit 80 extends the stop range when determining that the carriage 28 has stopped outside the stop range (S13: YES), and that the stop determination of the carriage 28 is possible. Thus, the profile calculating unit 82 switches from the speed control by the speed-control-profile generating unit 82a to the position proportional control by the stop-position-keeping-control-profile generating unit 82b, to control the main scanning motor 40 (S15). Thereafter, the motor control unit 76 (for example, the determining unit 80) performs the stop determination illustrated at step S2 based on the extended stop range.

On the other hand, the determining unit 80 outputs the switching instruction to the profile calculating unit 82 without changing the stop range when determining that the carriage 28 is not in the state enabling the stop determination (S16: NO). Thus, the profile calculating unit 82 switches from the speed control by the speed-control-profile generating unit 82a to the position proportional control by the stop-position-keeping-control-profile generating unit 82*b* to control the main scanning motor 40 (S15).

As described above, the determining unit 80 of the present embodiment extends the stop range when determining that the stop determination of the carriage 28 is possible even if the carriage 28 is outside the stop range and in unstable operation. Thus, the motor control unit 76 can perform the stop determination of the carriage 28, regarding that the carriage 28 is in the normal state.

Although the speed designated value generated by the stop-position-keeping-control-profile generating unit 82*b* and the detected speed is compared to perform the position proportional control also in the position proportional control in the embodiment described above, the control calculating unit itself may be switched to calculate the PWM command value directly based on the difference between the target stop position and the detection position.

The shape, arrangement, connection relationship, functions, and the like of the configuration of the embodiment described above can be changed appropriately.

For example, although the operation control by the motor control unit 76 described above is applied to the main scanning motor 40, the operation control may be applied to a control of others such as the sub-scanning motor 78.

In the above embodiment, the image forming apparatus of the present invention can be applied to a multifunction peripheral having at least two out of a copier function, a printer function, a scanner function, and a facsimile function, and to an image forming apparatus such as a copier, a printer, a scanner device, and a facsimile device.

According to an embodiment, an object of control to be moved can be stopped at a target position.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A movement control device comprising:
   a detecting unit configured to detect a position of a moving unit that is moved by a driving unit; and
   a controller configured to,
      determine whether the moving unit enters a stopped state at a position prior to reaching a target stop position based on the position of the moving unit after the moving unit starts a deceleration operation and during a speed control, the speed control being a mode in which the driving unit is driven based on a designated speed associated with the position of the moving unit,
      determine whether a difference between the position of the moving unit that has stopped and the target stop position is less than or equal to a threshold difference,
      switch the driving unit from the speed control to a position control, if the moving unit enters the stopped state at the position prior to reaching the target stop position during the speed control, and the difference between the position of the moving unit that has stopped and the target stop position is less than or equal to the threshold difference, the position control being a mode in which the driving unit is driven to move the moving unit toward the target stop position based on the difference between the position of the moving unit that has stopped and the target stop position,
      determine whether the moving unit stays in a stop range for a first threshold amount of time, the stop range including the target stop position,
      selectively extend the stop range to an extended stop range when the moving unit has stopped outside the stop range for the first threshold amount of time and the moving unit is performing an operation that will enable output of a stop response, the stop range including the target stop position, and
      output the stop response to receive a next instruction when the controller determines that the moving unit stays in the stop range for the first threshold amount of time and the stop range remains unchanged or is extended to the extended stop range.

2. The movement control device according to claim 1 wherein
   the detecting unit is configured to detect the position of the moving unit by counting a number of pulses output by an encoder sensor, and
   the controller is configured to determine, after the deceleration operation is started, that the moving unit is in the stopped state if the number of pulses output from the encoder sensor for a second threshold amount of time is equal to or less than a threshold number of pulses, the threshold number of pulses being greater than or equal to 1.

3. The movement control device according to claim 1, wherein
the controller is configured to determine, after the deceleration operation is started, that the moving unit is in the stopped state if the moving unit fails to cross the target stop position within a second threshold amount of time after a reference time at which the moving unit passes a reference position, the reference position being behind the target stop position with reference to a start position of the moving unit.

4. The movement control device according to claim 1, wherein
the controller is configured to switch the driving unit from the speed control to the position control, if the position of the moving unit is outside the stop range and the difference between the position of the moving unit and the target stop position is less than or equal to the threshold difference, the stop range including the target stop position.

5. The movement control device according to claim 1, wherein
the controller is configured to maintain control of the driving unit as the speed control, if the moving unit enters the stopped state at the position prior to reaching the target stop position, and the moving unit is in the stop range after the deceleration operation is started, the stop range including the target stop position.

6. An ink-droplet ejection device comprising:
the movement control device according to claim 1;
an ink-droplet ejecting unit configured to eject an ink droplet;
the moving unit configured to move together with the ink-droplet ejecting unit; and
the driving unit configured to be controlled by the movement control device, and to move the moving unit.

7. A movement control method comprising:
detecting a position of a moving unit that is moved by a driving unit;
determining whether the moving unit enters a stopped state at a position prior to reaching a target stop position based on the position of the moving unit after the moving unit starts a deceleration operation and during a speed control, the speed control being a mode in which the driving unit is driven based on a designated speed associated with the position of the moving unit;
determining whether a difference between the position of the moving unit that has stopped and the target stop position is less than or equal to a threshold difference;
switching the driving unit from the speed control to a position control, if the moving unit enters the stopped state at a position prior to reaching the target stop position, during the speed control, and the difference between the position of the moving unit that has stopped and the target stop position is less than or equal to the threshold difference, the position control being a mode in which the driving unit is driven to move the moving unit toward the target stop position based on the difference between the position of the moving unit that has stopped and the target stop position;
determining whether the moving unit stays in a stop range for a first threshold amount of time, the stop range including the target stop position;
selectively extending the stop range to an extended stop range when the moving unit has stopped outside the stop range for the first threshold amount of time and the moving unit is performing an operation that will enable output of a stop response, the stop range including the target stop position; and
outputting the stop response to receive a next instruction when the moving unit stays in the stop range for the first threshold amount of time and the stop range remains unchanged or is extended to the extended stop range.

8. A non-transitory computer-readable recording medium including a program that causes a computer that controls a driving unit based on a position of a moving unit that is moved by the driving unit, to execute:
determining whether the moving unit enters a stopped state at a position prior to reaching a target stop position based on the position of the moving unit after the moving unit starts a deceleration operation and during a speed control, the speed control being a mode in which the driving unit is driven based on a designated speed associated with the position of the moving unit;
determining whether a difference between the position of the moving unit that has stopped and the target stop position is less than or equal to a threshold difference;
switching the driving unit from the speed control to a position control the moving unit enters the stopped state at the position prior to reaching the target stop position during the speed control, and the difference between the position of the moving unit that has stopped and the target stop position is less than or equal to the threshold difference, the position control being a mode in which the driving unit is driven to move the moving unit toward the target stop position based on the difference between the position of the moving unit that has stopped and the target stop position;
determining whether the moving unit stays in a stop range for a first threshold amount of time, the stop range including the target stop position;
selectively extending the stop range to an extended stop range when the moving unit has stopped outside the stop range for the first threshold amount of time and the moving unit is performing an operation that will enable output of a stop response, the stop range including the target stop position; and
outputting the stop response to receive a next instruction when the moving unit stays in the stop range for the first threshold amount of time and the stop range remains unchanged or is extended to the extended stop range.

9. The movement control device according to claim 1, wherein the position control is a position proportion control mode in which the driving unit is driven at a variable speed that is directly proportionally to the difference between the position of the moving unit and the target stop position.

10. The movement control device according to claim 1, wherein the controller is configured to switch the driving unit from the speed control to the position control by switching from controlling the designated speed based on a first speed profile to controlling the designated speed based on a second speed profile, the first speed profile being associated with the speed control and the second speed profile being associated with the position control.

11. The movement control device according to claim 1, wherein the controller is configured to extend the stop range to the extended stop range such that the extended stop range is set based on a width of an injection ink receiving slot.

12. The movement control method according to claim 7, wherein the switching selectively switches to the position control based on the difference between the position of the moving unit that has stopped and the target stop position such that position control is a position proportion control mode in which the driving unit is driven at a variable speed that is directly proportionally to the difference between the position of the moving unit and the target stop position.

13. The non-transitory computer-readable recording medium according to claim 8, wherein the computer selectively switches to the position control based on the difference between the position of the moving unit that has stopped and the target stop position such that the position control is a position proportion control mode in which the driving unit is driven at a variable speed that is directly proportionally to the difference between the position of the moving unit and the target stop position.

* * * * *